(12) United States Patent
Kinoshita et al.

(10) Patent No.: US 9,262,500 B2
(45) Date of Patent: Feb. 16, 2016

(54) MEMORY SYSTEM INCLUDING KEY-VALUE STORE

(75) Inventors: Atsuhiro Kinoshita, Kamakura (JP); Takao Marukame, Tokyo (JP); Kosuke Tatsumura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 134 days.

(21) Appl. No.: 13/569,542

(22) Filed: Aug. 8, 2012

(65) Prior Publication Data
US 2013/0042055 A1 Feb. 14, 2013

(30) Foreign Application Priority Data

Aug. 8, 2011 (JP) ................................ 2011-173358

(51) Int. Cl.
*G06F 17/30* (2006.01)
*G06F 12/02* (2006.01)

(52) U.S. Cl.
CPC ...... *G06F 17/30587* (2013.01); *G06F 12/0292* (2013.01)

(58) Field of Classification Search
None
See application file for complete search history.

(56) References Cited

U.S. PATENT DOCUMENTS

| 6,434,662 | B1* | 8/2002 | Greene et al. ................. 711/108 |
| 7,058,639 | B1* | 6/2006 | Chatterjee et al. ................ 1/1 |
| 8,635,402 | B2 | 1/2014 | Torii |
| 2003/0135695 | A1 | 7/2003 | Gray et al. |
| 2008/0098015 | A1* | 4/2008 | Davis et al. ................... 707/100 |
| 2010/0217953 | A1* | 8/2010 | Beaman et al. ............... 711/216 |
| 2011/0153582 | A1* | 6/2011 | Buchmann et al. .......... 707/706 |
| 2011/0246451 | A1 | 10/2011 | Tatsumura et al. |
| 2011/0276744 | A1* | 11/2011 | Sengupta et al. ............. 711/103 |
| 2012/0036317 | A1 | 2/2012 | Torii |
| 2012/0117354 | A1 | 5/2012 | Tatsumura et al. |
| 2013/0036277 | A1* | 2/2013 | Szczepkowski et al. ..... 711/159 |

FOREIGN PATENT DOCUMENTS

| JP | 2005-209214 | 8/2005 |
| JP | 4167359 | 8/2008 |
| WO | WO 2010114006 A1 | 10/2010 |

OTHER PUBLICATIONS

Martinez, Tony. "Smart Memory Architecture and Methods." Future Generation Computing Systems. vol. 6. No. 1. p. 26-58, 1990.*
Szczepkowski, Jerzy. "Solid State Deduplication Index." U.S. Appl. No. 61/381,161, filed Sep. 9, 2010.*

(Continued)

*Primary Examiner* — Charles Rones
*Assistant Examiner* — Hewy Li
(74) *Attorney, Agent, or Firm* — Finnegan, Henderson, Farabow, Garrett & Dunner, LLP

(57) ABSTRACT

According to one embodiment, a memory system including a key-value store containing key-value data as a pair of a key and a value corresponding to the key, includes a first memory, a control circuit and a second memory. The first memory is configured to contain a data area for storing data, and a table area containing the key-value data. The control circuit is configured to perform write and read to the first memory by addressing, and execute a request based on the key-value store. The second memory is configured to store the key-value data in accordance with an instruction from the control circuit. The control circuit performs a set operation by using the key-value data stored in the first memory, and the key-value data stored in the second memory.

13 Claims, 10 Drawing Sheets

(56) References Cited

OTHER PUBLICATIONS

Satyamoorthy, Prateeksha. "STT-RAM for Shared Memory in GPUs." Published May 2011.*

Bandyopadhyay, Shamik. "A Scratchpad Memory Allocation Scheme for Dataflow Models." Published Aug. 25, 2008.*

Ekker, Neal. "Solid State Storage 101." SNIA. Published Jan. 2009.*

"Direct Memory Access (DMA)." Published Feb. 1, 2002.*

Gokhale, Salil, et al. "KVZone and the search for a write-optimized key-value store." Proceedings of the 2nd USENIX conference on Hot topics in storage and file systems. USENIX Association, 2010.*

Marukame et al. "Semiconductor Memory Device, Information Processing System and Control Method." filed Feb 8, 2013. U.S. Appl. No. 13/762,986.*

Kinoshita et al. "Memory System Including Key-Value Store." filed Aug 8, 2012. U.S. Appl. No. 13/569,542.*

Inofuentes, Jason. "SanDisk-Toshiba Take Back the Crown With a Different Kind of NAND". AnandTech. Published May 5, 2011. <http://www.anandtech.com/show/4284/sandisktoshiba-take-back-the-crown-with-a-differentkind- of-nand>.*

Martinez, Tony R., "Smart Memory Architecture and Methods", *Future Generation Computing Systems*, vol. 6, No. 1, pp. 26-58 (1990), 23 pgs.

Notification for Filing Opinion Issued by Korean Intellectual Property Office in Korean Application No. 10-2012-8607 on Aug. 28, 2013, 4 pgs.

Zobel, J., "Inverted Files Versus Signature Files for Text Indexing," ACM Transactions on Database Systems, vol. 23, No. 4, pp. 453-490 (1998).

Bando, U.S. Appl. No. 13/557,401, filed Jul. 25, 2012.

First Office Action mailed by the Japanese Patent Office on Nov. 25, 2014, in Japanese patent application No. 2011-173358.

Second Office Action mailed by the State Intellectual Property Office of the People's Republic of China on Sep. 30, 2015, in Chinese patent application No. 201210279821.4, 7 pgs.

* cited by examiner

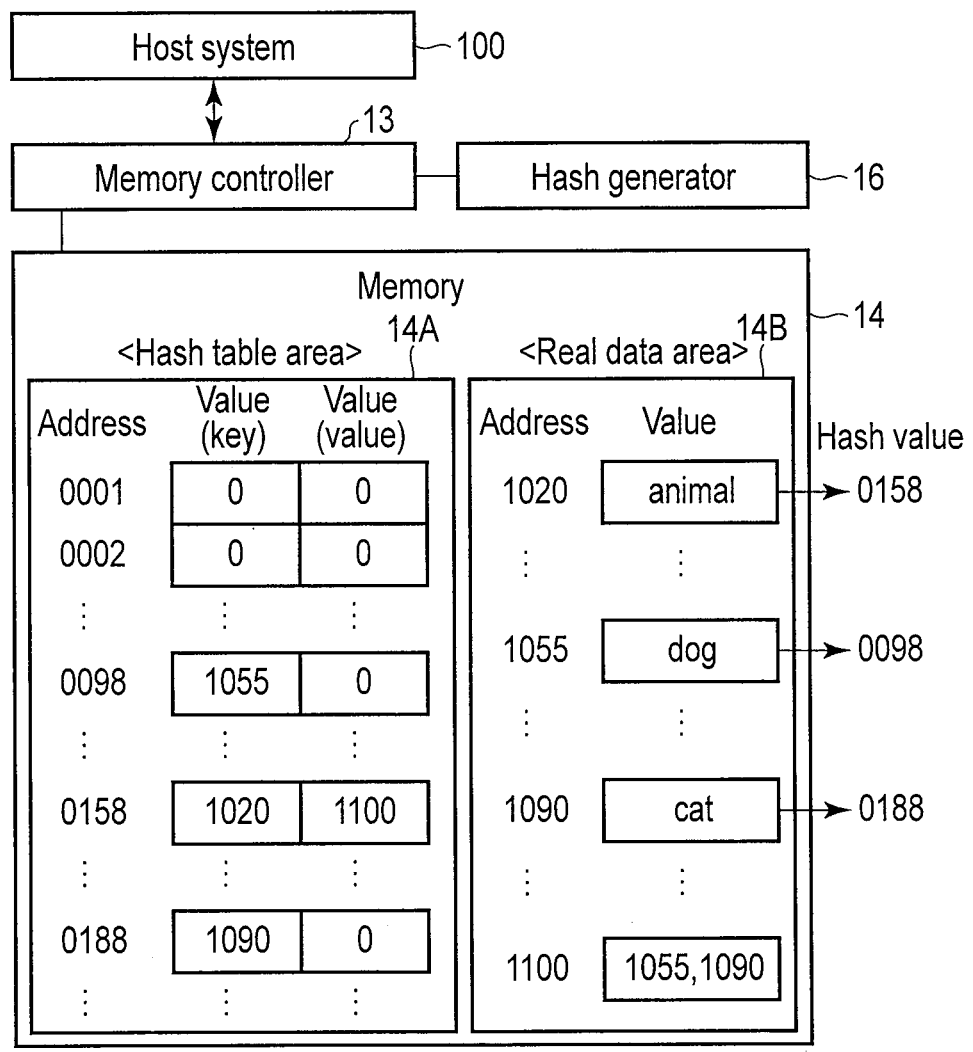
F I G. 1

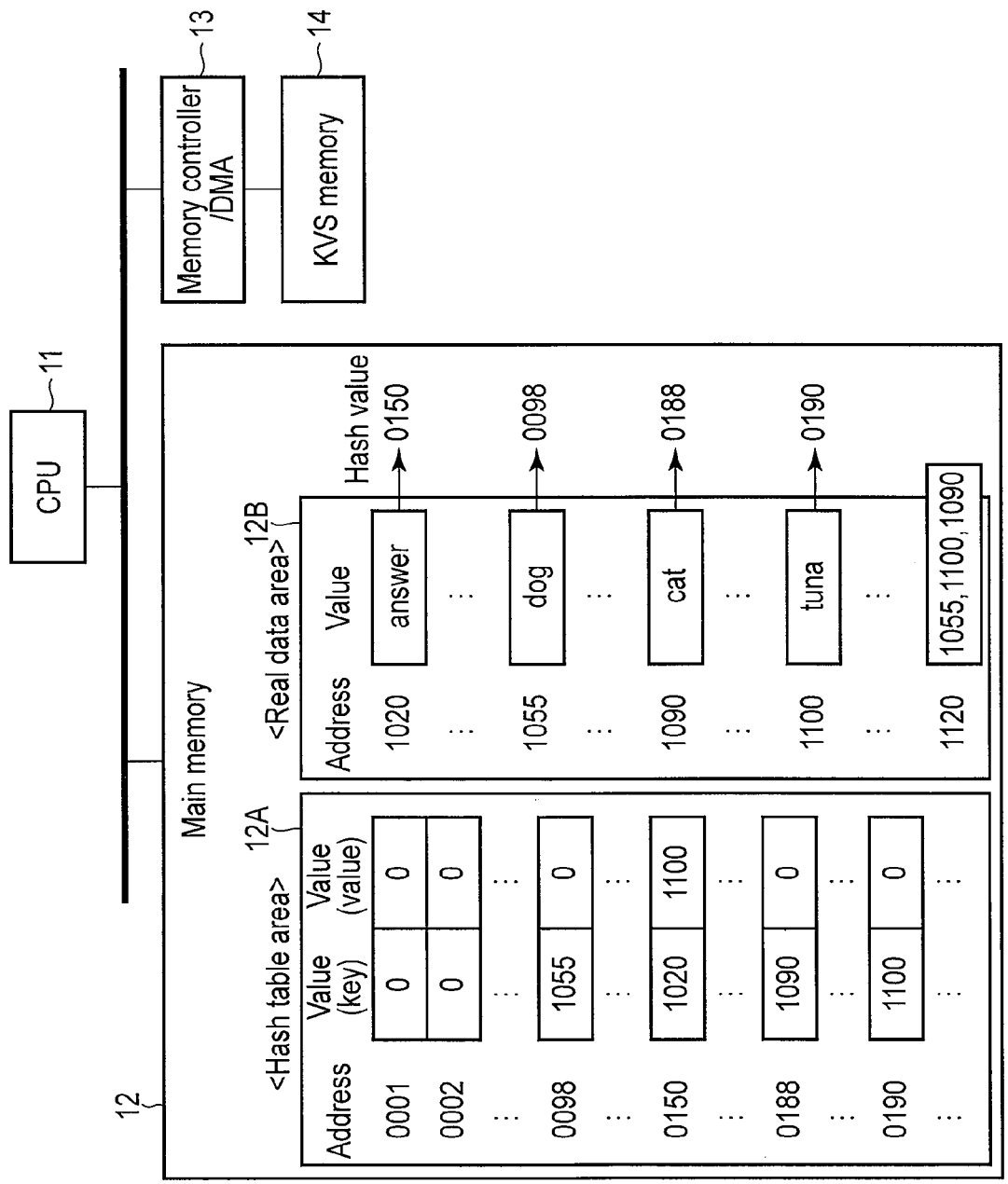
F I G. 4

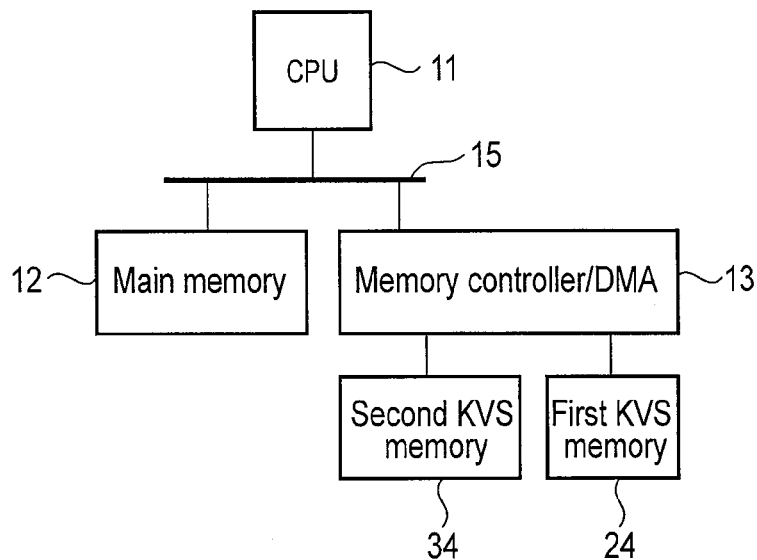
F I G. 11
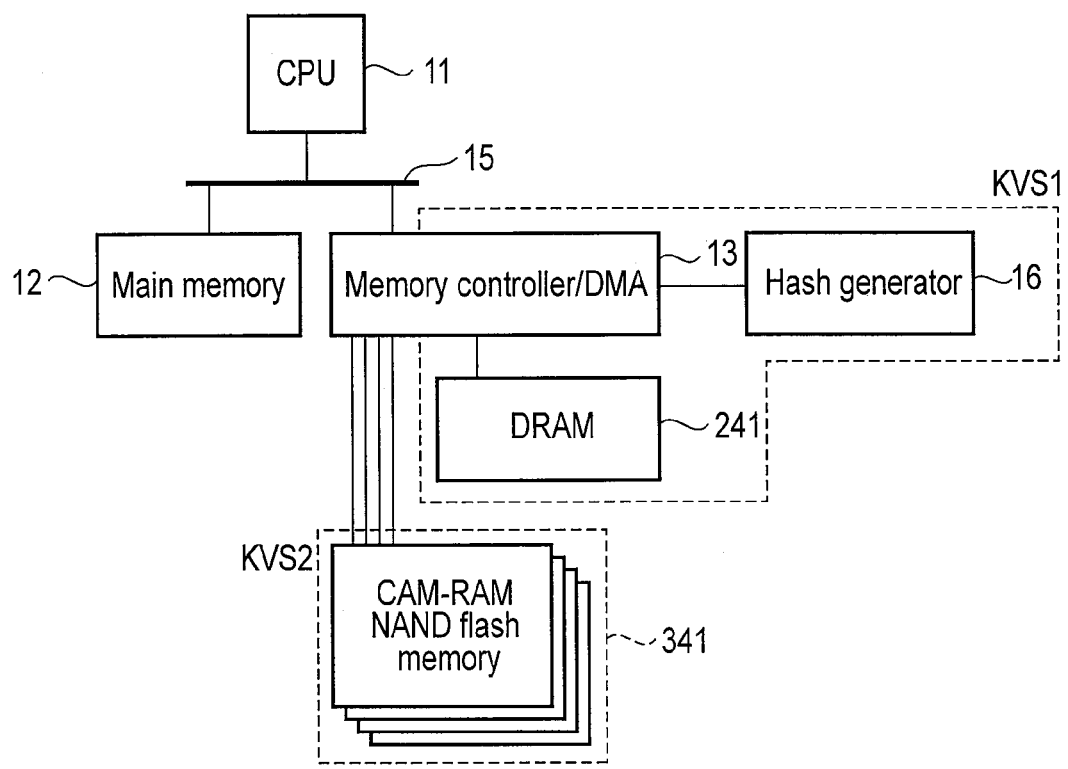
F I G. 12

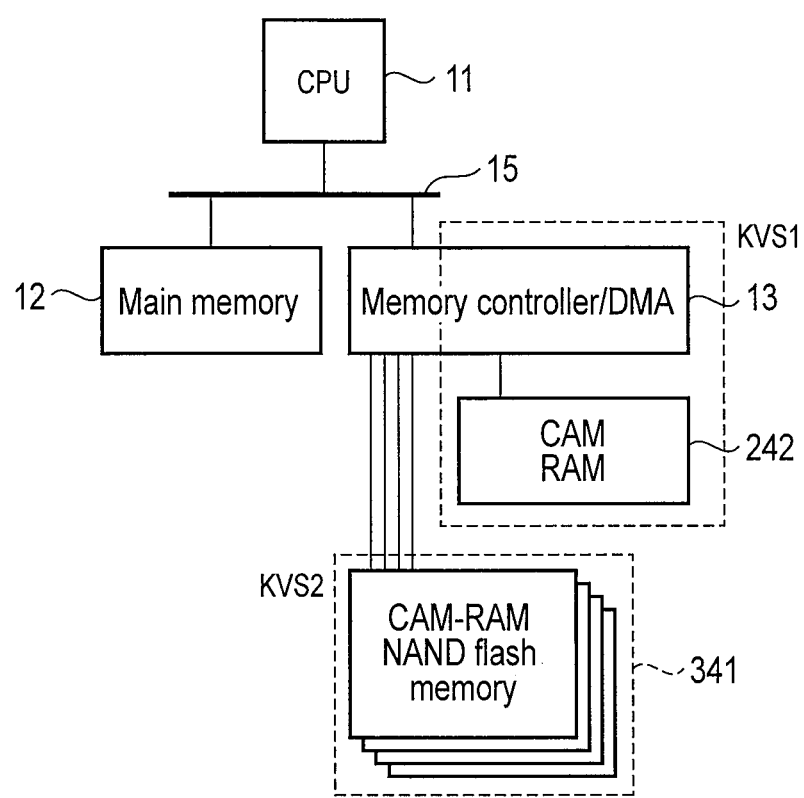
F I G. 13

MEMORY SYSTEM INCLUDING KEY-VALUE STORE

CROSS-REFERENCE TO RELATED APPLICATIONS

This application is based upon and claims the benefit of priority from Japanese Patent Application No. 2011-173358, filed Aug. 8, 2011, the entire contents of which are incorporated herein by reference.

FIELD

Embodiments described herein relate generally to a memory system which is accessed by a host system and includes a key-value store.

BACKGROUND

In recent general computer systems including memory systems, many data operations, particularly, operations of processing data sets frequently occur. For example, an operation of searching for data containing two keywords A and B in a full text search system is to obtain the intersection of a data set containing A and a data set containing B.

A presently most widely used general computer system is a memory system that manages data by using addresses. When processing data in this manner, data and addresses are managed in one-to-one correspondence with each other. To process data sets as described above, therefore, software processing based on a complicated algorithm is generally essential.

On the other hand, some memory systems manage data by using their contents themselves instead of addresses. From the viewpoints of the cost and the compatibility with the existing systems, however, these memory systems are used in special applications but rarely used in general computer systems.

When processing data sets in the conventional computer systems, complicated software processing is necessary owing to the limitations on memory systems. This degrades the performance and makes the systems difficult to handle.

BRIEF DESCRIPTION OF THE DRAWINGS

FIG. 1 is a view showing a first arrangement example of a KVS memory used in an embodiment;

FIG. 4 is a view showing an arrangement example of a data area in a main memory of the first embodiment;

FIG. 11 is a block diagram showing a hardware arrangement of a memory system of a second embodiment;

FIG. 12 is a block diagram showing a hardware arrangement of a memory system of a first modification of the second embodiment; and FIG. 13 is a block diagram showing a hardware arrangement of a memory system of a second modification of the second embodiment.

DETAILED DESCRIPTION

Figure 2:
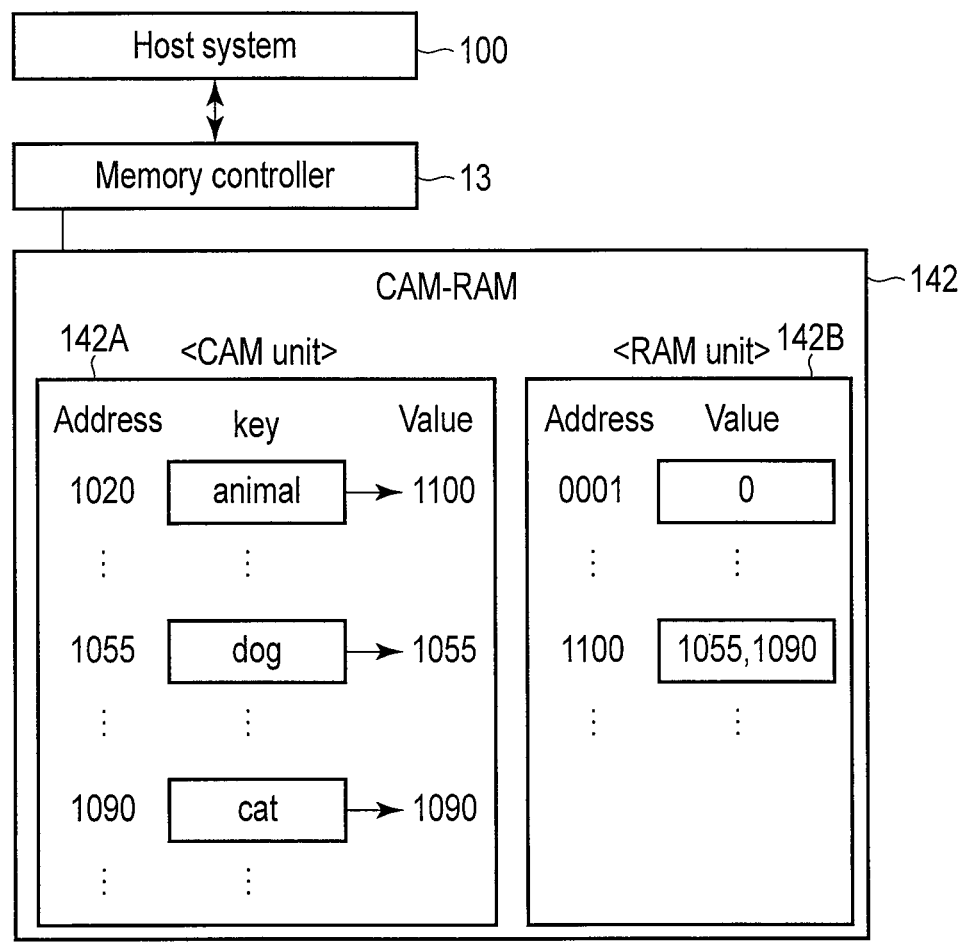
FIG. 2 is a view showing a second arrangement example of the KVS memory used in the embodiment.

In general, according to one embodiment, a memory system including a key-value store containing key-value data as a pair of a key and a value corresponding to the key, includes a first memory, a control circuit and a second memory. The first memory is configured to contain a data area for storing data, and a table area containing the key-value data. The control circuit is configured to perform write and read to the first memory by addressing, and execute a request based on the key-value store. The second memory is configured to store the key-value data in accordance with an instruction from the control circuit. The control circuit performs a set operation by using the key-value data stored in the first memory, and the key-value data stored in the second memory.

In the following explanation, the same reference numerals denote constituent elements having the same functions and arrangements, and a repetitive explanation will be made only when necessary.

A memory system (search memory) capable of set operations according to the embodiment includes a memory having at least one key-value store function (to be referred to as a KVS hereinafter). The KVS is a database management method capable of writing a pair of a key and value and reading out the value by designating the key. In the KVS, data is managed as key-value data as a pair of a key and a value corresponding to the key. When the key is given as a search request, the value corresponding to the key can be output. In this specification, a memory having this KVS will be referred to as a KVS memory hereinafter.

The KVS memory and its instructions will be explained in detail below.

The KVS memory is a memory including KVS instructions such as at least GET, PUT, and DELETE, in addition to normal memory access instructions, and the meanings of these instructions are as follows.

(1) GET(key, value): When no element (value) is designated (NULL), a data set corresponding to the key is obtained. When an element (value) is designated, the value itself or TRUE is returned if the value exists in the data set. If the value does not exist in the data set, an empty set (NULL) or FALSE is returned. An empty set (NULL) or FALSE is also returned if there is no data set corresponding to the key.

(2) PUT(key, value): An element (value) is added to a data set corresponding to the key. Nothing is performed if the element already exists in the data set.

(3) DELETE(key, value): An element (value) is deleted from a data set corresponding to the key. Nothing is performed if the element does not exist in the data set.

Practical arrangement examples and operation examples of the KVS memory will be described below.

FIG. 1 is a view showing the first arrangement example of the KVS memory used in the embodiment.

As shown in FIG. 1, a KVS memory 14 is connected to, e.g., a memory controller 13 and hash generator 16. In addition, a host system 100 is connected to the memory controller 13. The hash generator 16 has a so-called hash function of converting data having an arbitrary length into a bit string having a fixed length. The host system 100 includes a central processing unit (CPU) and main memory.

A versatile memory such as a DRAM is used as the KVS memory 14. The KVS memory 14 can be divided into at least two memory areas, i.e., a hash table area 14A and real data area 14B. Although the KVS memory 14 can have a plurality of memory areas, the size of the hash table area 14A is larger than a size that can be expressed by a hash value (fixed-length bit data) generated by the hash generator 16. The hash table area 14A can be divided into an area capable of storing the real address of a key and an area capable of storing the real address of a value. The memory capacity of the hash table area 14A is not fixed but can be varied (increased or decreased) in accordance with a request based on the key-value store. Also, the real data area 14B stores data.

The memory controller 13 interprets a KVS instruction received from the host system 100, and performs an operation to be described below for the KVS memory 14 and hash generator 16.

Assume that a key "animal" does not exist in the KVS memory 14 yet. When the memory controller 13 receives instructions "PUT(animal, dog)" and "PUT(animal, cat)" in order, the hash generator 16 generates hash values corresponding to "animal", "dog", and "cat". Assume that these hash values are bit strings having fixed lengths of 158, 98, and 188 in order.

In this state, whether the key "animal" is already stored is determined by checking the contents of addresses corresponding to the hash values in the hash table area 14A. Since the key does not exist yet (the value is 0), areas (1020, 1055, and 1090) for storing these real data are secured, and the start addresses of these areas are stored in the key area of the hash table area 14A. Real data "animal", "dog", and "cat" are stored in the secured areas (1020, 1055, and 1090).

In addition, to associate the key "animal" with a data set {dog, cat}, areas for the individual elements are secured in the real data area 14B, and the start address (1100) is written in a value area corresponding to "animal" in the hash table area 14A. Then, data (1055, 1090) obtained by arranging the start addresses of the elements is stored in the real data area 14B.

Consequently, the data set {dog, cat} corresponding to the key "animal" is formed in the KVS memory 14. FIG. 1 shows the internal state of the KVS memory 14.

Assume that the memory controller 13 then receives an instruction "GET(animal, NULL)". In this case, the real data is read out from the contents (the start address of the real data of the element) in the value area (1100) written at the address (0158) as the hash value of "animal" in the hash table area 14A. That is, {dog, cat} is output to the host system 100.

If the instruction is GET(animal, dog), the memory controller 13 does not output any element, but outputs "dog" or TRUE to the host system 100 only when there is an element matching "dog" as the second argument. If the instruction is GET(animal, lion), there is no matching element, so the memory controller 13 outputs NULL or FALSE to the host system 100.

Furthermore, if the memory controller 13 receives an instruction "DELETE(animal, dog)", "dog" is deleted from the data set corresponding to "animal". More specifically, elements starting from the address (1100) are checked, and the remainder (1090) except for "dog" is written as a value. Alternatively, it is also possible to sequentially write the elements except for "dot" in memory areas newly secured in the real data area 14B, and finally rewrite the value area of "animal" in the hash table area 14A, thereby releasing the original address (1100).

Note that if the element "dog" itself does not belong to any set except for "animal" when executing DELETE, an operation (garbage collection) of releasing a memory used by the element "dog" is sometimes performed.

If the instruction is GET(animal, NULL), {cat} is returned to the host system 100. If the instruction is DELETE(animal, cat), the key area and value area of "animal" in the hash table area 14A are released, and the data set corresponding to the key "animal" disappears. That is, if the instruction is GET (animal, NULL), an empty set (NULL) is returned to the host system 100.

In addition to the above-mentioned method, there are several methods of implementing the arrangement of the KVS memory. As a practical example, a method of forming the hash table area 14A in the arrangement shown in FIG. 1 by using a content-addressable memory (CAM) will be explained below.

FIG. 2 is a view showing the second arrangement example of the KVS memory used in the embodiment.

This arrangement example includes a CAM-RAM 142 as a KVS memory, and a memory controller 13 that interprets a KVS instruction input from a host system 100 and controls the CAM-RAM 142 and other modules.

The CAM-RAM 142 includes a CAM unit 142A as a table area, and a RAM (Random Access Memory) unit 142B as a data area. A versatile memory such as a DRAM or NAND flash memory can be used as the RAM unit 142B. Although there are several types of content-addressable memories (CAM units), this example adopts, in the CAM unit 142A, a CAM that returns fixed-length data (value) if the CAM contains input data (key), in addition to normal read and write using addresses. That is, the CAM unit 142A has a function of simultaneously comparing input data (key) with all stored data in parallel to determine whether the input data matches each stored data, and outputting the value of stored data matching the input data.

The CAM-RAM is a system in which the content-addressable memory (CAM) outputs an address, and the RAM that is accessed by an address outputs data. In the CAM-RAM, a key and value can directly be read out and written without using any hash value. This obviates the need for the hash generator 16 when compared to the arrangement example shown in FIG. 1.

The operations of KVS instructions in the second arrangement example will now be explained.

Assume that none of keys "animal", "dog", and "cat" exists in the CAM unit 142A yet. When receiving instructions "PUT (animal, dog)" and "PUT(animal, cat)" in order, the memory controller 13 checks whether the keys are already stored in the CAM unit 142A. Since none of these keys exists yet, these keys are stored in the CAM unit 142A. Then, the values (in this example, 1055 and 1090 as the start addresses) of elements ("dog" and "cat") in the CAM unit are stored as a set by securing a memory area in the RAM unit 142B. In addition, the start address (1100) of this set is stored as the value of the key ("animal") of the CAM unit 142A.

Although the above-mentioned set can also be stored in the CAM unit, the method as described above is preferably used because the cost per bit of a CAM is generally higher than that of a RAM. FIG. 2 shows the internal state of the CAM-RAM 142.

Assuming that the memory controller 13 then receives an instruction "GET(animal, NULL)", a set {1055, 1090} can be read out by regarding 1100 that is a value for "animal" (key)

in the CAM unit 142A as the address in the RAM unit 142B, and a key area, i.e., {dog, cat} obtained by regarding the set {1055, 1090} as the address in the CAM unit 142A is output to the host system 100.

If the instruction is GET(animal, dog), the memory controller 13 does not output any element, but outputs "dog" or TRUE to the host system 100 only when there is an element matching "dog" as the second argument. If the instruction is GET(animal, lion), there is no matching element, so the memory controller 13 outputs NULL or FALSE to the host system 100.

Furthermore, if the memory controller 13 receives an instruction "DELETE(animal, dog)", "dog" is deleted from the data set corresponding to "animal". More specifically, elements starting from the address (1100) are checked, and the remainder (1090) except for "dog" is written as a value. Alternatively, it is also possible to sequentially write the elements except for "dot" in memory areas newly secured in the RAM unit, and finally rewrite the value area of "animal" in the CAM unit 142A, thereby releasing the original address (1100).

Note that if the element "dog" itself does not belong to any set except for "animal" when executing DELETE, an operation (garbage collection) of releasing a memory used by the element "dog" is sometimes performed.

If the instruction is GET(animal, NULL), {cat} is returned to the host system 100. If the instruction is DELETE(animal, cat), the key area and value area of "animal" in the CAM unit 142A are released, and the data set corresponding to the key "animal" disappears. That is, if the instruction is GET(animal, NULL), an empty set (NULL) is returned to the host system 100.

First Embodiment

[1] Hardware Arrangement

First, the hardware arrangement of a memory system of the first embodiment will be explained.

Figure 3:
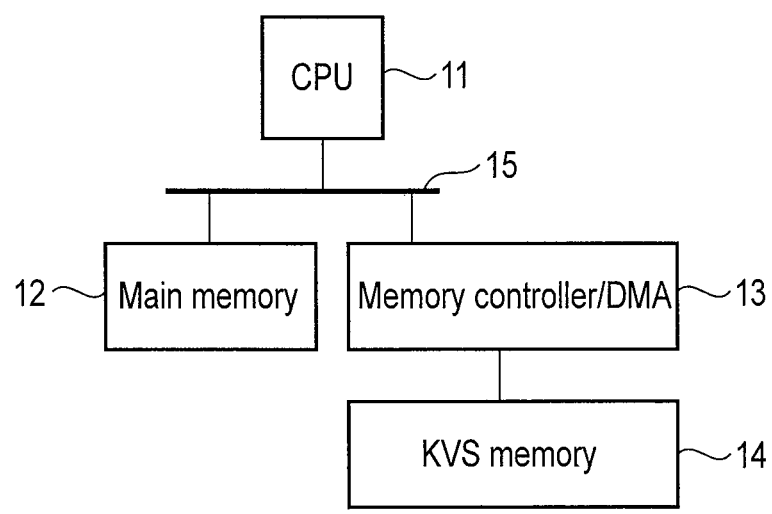
FIG. 3 is a block diagram showing the hardware arrangement of a memory system of a first embodiment.

FIG. 3 is a block diagram showing the hardware arrangement of the memory system of the first embodiment.

As shown in FIG. 3, the memory system includes a CPU 11, main memory 12, memory controller 13, and KVS memory 14. The CPU 11, main memory 12, and memory controller 13 are connected by a bus 15.

The CPU 11 controls the main memory 12, memory controller 13, and KVS memory 14, and performs set operations (to be described later). The memory controller 13 controls the KVS memory 14 and other memories (not shown). The memory controller 13 includes a circuit having a direct memory access (DMA) function. When using the DMA function, data transfer between the memory controller 13 and main memory 12 can directly be controlled without the CPU 11.

The KVS memory 14 contains a data area as shown in FIG. 1 or 2. The arrangement and operation of the KVS memory 14 are the same as those explained with reference to FIG. 1 or 2, so a repetitive explanation thereof will be omitted.

FIG. 4 shows an arrangement example of the data area in the main memory 12. The CPU 11 and main memory 12 form a memory having a key-value store (KVS). For example, when the CPU 11 has a function of generating a hash value, the main memory 12 includes a hash table area 12A and real data area 12B as shown in FIG. 4. Also, the main memory 12 stores data and instruction codes as a main storage device.

[2] Set Operations

Next, the set operations in the memory system of the first embodiment will be explained.

Assume that two data sets "animal={dog, tuna, cat}" and "fish={porgy, tuna, salmon}" are stored in the KVS memory 14. The processing of an AND operation, OR operation, and NOT operation will be described below.

(1) AND Operation

Figure 5:
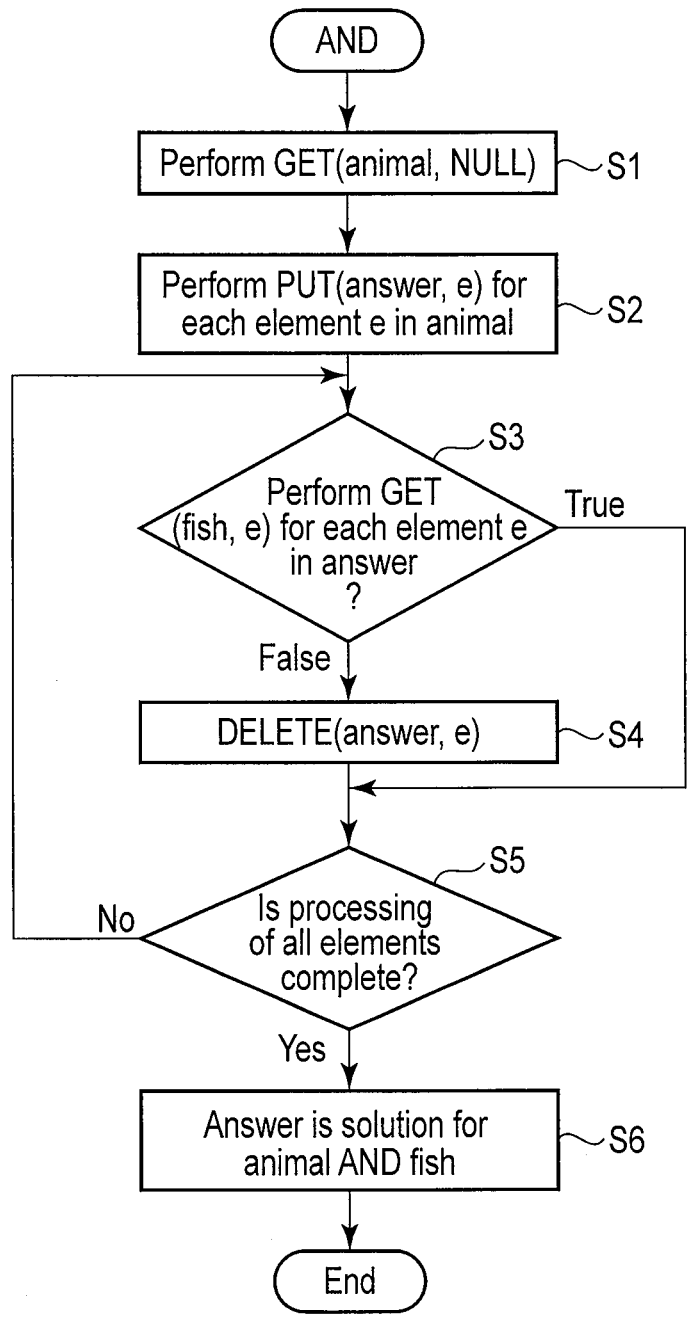
FIG. 5 is a flowchart showing the processing of an AND operation in the first embodiment.

FIG. 5 is a flowchart showing the processing of the AND operation in the first embodiment.

As a practical example, the processing of an operation "animal AND fish" will be explained. First, the CPU 11 issues an instruction "GET(animal, NULL)" to the KVS memory 14 via the main controller 13 (step S1). Subsequently, the CPU 11 causes the main memory 12 to store, as a set "answer", a data set output from the KVS memory 14 in response to the instruction "GET(animal, NULL)", in the same manner as in the operation of the KVS instruction described above (by processing the hash function and the like by software). That is, the CPU 11 issues instructions "PUT(answer, dog)", "PUT(answer, tuna)", and "PUT(answer, cat)" to the main memory 12. Consequently, the main memory 12 stores a set "answer={dog, tuna, cat}" (step S2). The main memory 12 thus functions as a memory having key-value data. That is, the main memory 12 stores a pair of "answer" as a key and {dog, tuna, cat} as a value.

Then, the CPU 11 checks whether each element in the set "answer" in the main memory 12 exists in a set "fish" in the KVS memory 14. First, the CPU 11 issues an instruction "GET(fish, dog)" to the KVS memory 14 (step S3). Since the return value is FALSE, the CPU 11 deletes an element "dog" in the set "answer" in the main memory 12. That is, the CPU 11 issues an instruction "DELETE(answer, dog)" to the main memory 12 (step S4).

Subsequently, the CPU 11 determines whether the processing of all elements in the set "answer" in the main memory 12 is complete (step S5). Since not all the elements in the set "answer" are completely processed, the CPU 11 returns to step S3, and repeats the processing from step S3.

The CPU 11 searches the set "fish" in the KVS memory 14 for "tuna". That is, the CPU 11 issues an instruction "GET (fish, tuna)" to the KVS memory 14 (step S3). Since the return value is TRUE, the CPU 11 advances to the next step.

The CPU 11 performs the same processing for "cat", i.e., searches the set "fish" in the KVS memory 14 for "cat". That is, the CPU 11 issues an instruction "GET(fish, cat)" to the KVS memory 14 (step S3). Since the return value is FALSE, the CPU 11 deletes the element "cat" in the set "answer" in the main memory 12. That is, the CPU 11 issues an instruction "DELETE(answer, cat)" to the main memory 12 (step S4).

When the processing of all the elements in the set "answer" is complete in step S5, the set "answer" in the main memory 12 becomes "answer={tuna}", and this is the solution for the AND operation (step S6).

Note that it is also possible to simultaneously perform a plurality of AND operations by preparing a solution set having a name different from "answer".

(2) OR Operation

Figure 6:
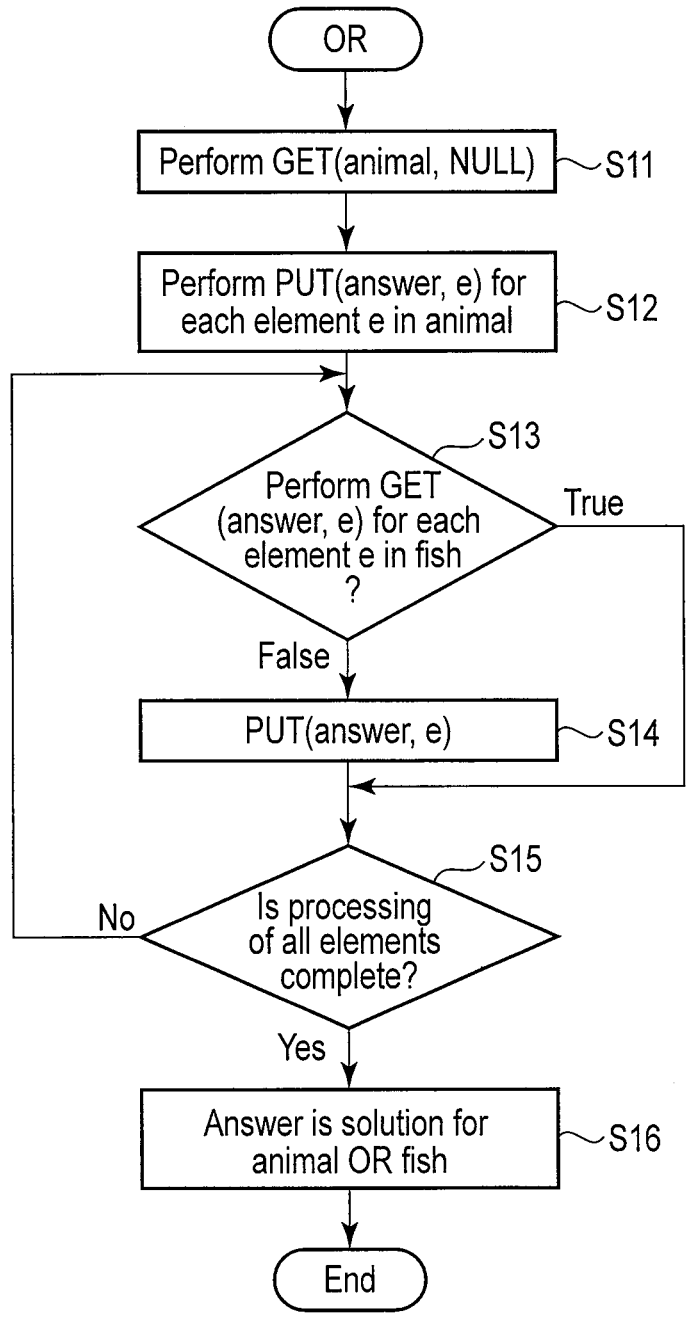
FIG. 6 is a flowchart showing the processing of an OR operation in the first embodiment.

FIG. 6 is a flowchart showing the processing of the OR operation in the first embodiment.

As a practical example, the processing of an operation "animal OR fish" will be explained. First, the CPU 11 issues an instruction "GET(animal, NULL)" to the KVS memory 14 via the main controller 13 (step S11). Subsequently, the CPU 11 causes the main memory 12 to store, as a set "answer", a data set output from the KVS memory 14 in response to the instruction "GET(animal, NULL)". That is, the CPU 11 issues instructions "PUT(answer, dog)", "PUT(answer, tuna)", and "PUT(answer, cat)" to the main memory 12. Consequently, the main memory 12 stores a set "answer={dog, tuna, cat}" (step S12). The main memory 12 thus functions as a memory having key-value data. That is, the main memory 12 stores a pair of "answer" as a key and {dog, tuna, cat} as a value.

Then, the CPU 11 checks whether each element in a set "fish" in the KVS memory 14 exists in the set "answer" in the main memory 12. First, the CPU 11 issues an instruction "GET(answer, porgy)" to the main memory 12 (step S13). Since the return value is FALSE, the CPU 11 puts "porgy" in the set "answer" in the main memory 12. That is, the CPU 11 issues an instruction "PUT(answer, porgy)" to the main memory 12 (step S14).

Subsequently, the CPU 11 determines whether the processing of all elements in the set "fish" in the KVS memory 14 is complete (step S15). Since not all the elements in the set "fish" are completely processed, the CPU 11 returns to step S13, and repeats the processing from step S13.

The CPU 11 checks whether "tuna" in the set "fish" in the KVS memory 14 exists in the set "answer" in the main memory 12. That is, the CPU 11 issues an instruction "GET (answer, tuna)" to the main memory 12 (step S13). Since the return value is TRUE, the CPU 11 advances to the next step.

The CPU 11 performs the same processing for "salmon", i.e., checks whether "salmon" in the set "fish" exists in the set "answer" in the main memory 12. That is, the CPU 11 issues an instruction "GET(answer, salmon)" to the main memory 12 (step S13). Since the return value is FALSE, the CPU 11 puts "salmon" in the set "answer" in the main memory 12. That is, the CPU 11 issues an instruction "PUT (answer, salmon)" to the main memory 12 (step S14).

When the processing of all the elements in the set "fish" is complete in step S15, the set "answer" in the main memory 12 becomes "answer={dog, tuna, cat, porgy, salmon}", and this is the solution for the OR operation (step S16).

Note that it is also possible to simultaneously perform a plurality of OR operations by preparing a solution set having a name different from "answer".

(3) NOT Operation

Figure 7:
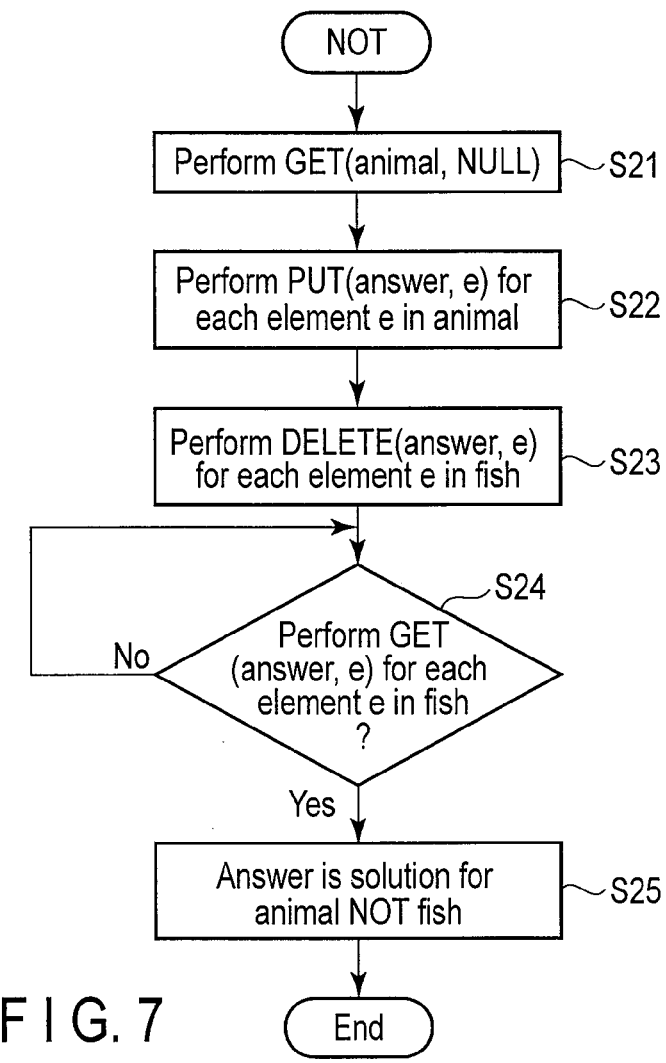
FIG. 7 is a flowchart showing the processing of a NOT operation in the first embodiment.

FIG. 7 is a flowchart showing the processing of the NOT operation in the first embodiment.

As a practical example, the processing of an operation "animal NOT fish" will be explained. First, the CPU 11 issues an instruction "GET(animal, NULL)" to the KVS memory 14 via the main controller 13 (step S21). Subsequently, the CPU 11 causes the main memory 12 to store, as a set "answer", a data set output from the KVS memory 14 in response to the instruction "GET(animal, NULL)". That is, the CPU 11 issues instructions "PUT(answer, dog)", "PUT(answer, tuna)", and "PUT(answer, cat)" to the main memory 12. Consequently, the main memory 12 stores a set "answer={dog, tuna, cat}" (step S22). The main memory 12 thus functions as a memory having key-value data. That is, the main memory 12 stores a pair of "answer" as a key and {dog, tuna, cat} as a value.

Then, the CPU 11 deletes each element in a set "fish" in the KVS memory 14, from the set "answer" in the main memory 12. First, the CPU 11 issues an instruction "DELETE(answer, porgy)" to the main memory 12 (step S23).

Subsequently, the CPU 11 determines whether the processing of all elements in the set "fish" in the KVS memory 14 is complete (step S24). Since not all the elements in the set "fish" are completely processed, the CPU 11 returns to step S23, and repeats the processing from step S23.

Similarly, the CPU 11 deletes "tuna" and "salmon" in the set "fish" in the KVS memory 14, from the set "answer" in the main memory 12 (step S23).

When the processing of all the elements in the set "fish" is complete in step S24, the set "answer" in the main memory 12 becomes "answer={dog, cat}", and this is the solution for the NOT operation (step S25).

Note that it is also possible to simultaneously perform a plurality of NOT operations by preparing a solution set having a name different from "answer".

Note also that all the works performed by the CPU 11 described above can be executed by the direct memory access (DMA) function of the memory controller 13. When the DMA function of the memory controller 13 performs all the works performed by the CPU 11, the above-described set operations can be performed without applying any load on the CPU 11.

[3] First Modification

Figure 8:
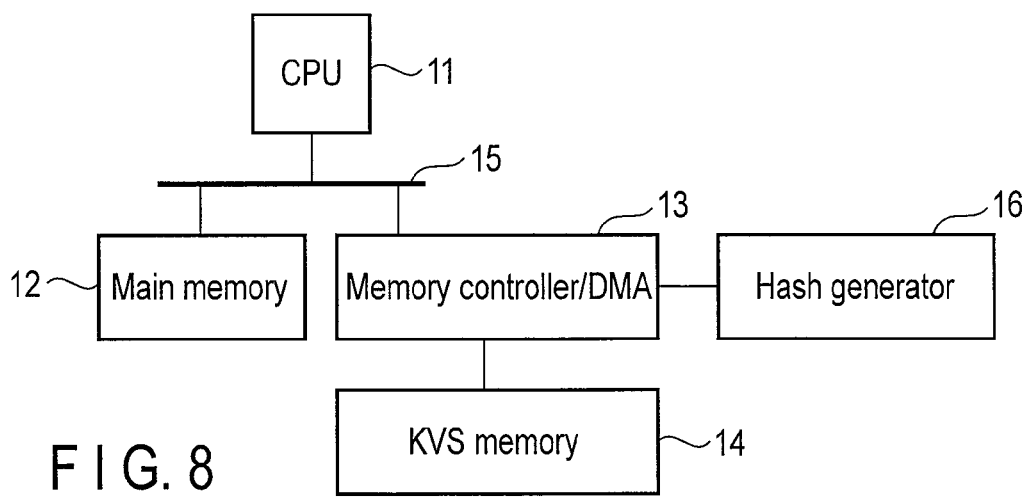
FIG. 8 is a block diagram showing a hardware arrangement of a memory system of a first modification of the first embodiment.

FIG. 8 is a block diagram showing the hardware arrangement of a memory system of the first modification according to the first embodiment.

As shown in FIG. 8, the first modification has an arrangement including a hash generator 16 in the memory system of the first embodiment shown in FIG. 3. The hash generator 16 has a so-called hash function of converting data having an arbitrary length into a bit string having a fixed length. In this modification, the hash generator 16 generates an address in which key-value data is stored, in response to input data (key).

A KVS memory 14 shown in FIG. 8 has the same arrangement as that of the KVS memory 14 shown in FIG. 1. Also, a main memory 12 has the same arrangement as that of the main memory 12 shown in FIG. 4. In this modification, therefore, a detailed explanation of the arrangements and operations of the KVS memory 14 and main memory 12 shown in FIG. 8 will be omitted.

The processing of set operations in the first modification is the same as that in the first embodiment. Since the first modification includes the hash generator 16, the load on a CPU 11 can be reduced when executing a set operation. The rest of the arrangements and effects are the same as those of the first embodiment.

[4] Second Modification

Figure 9:
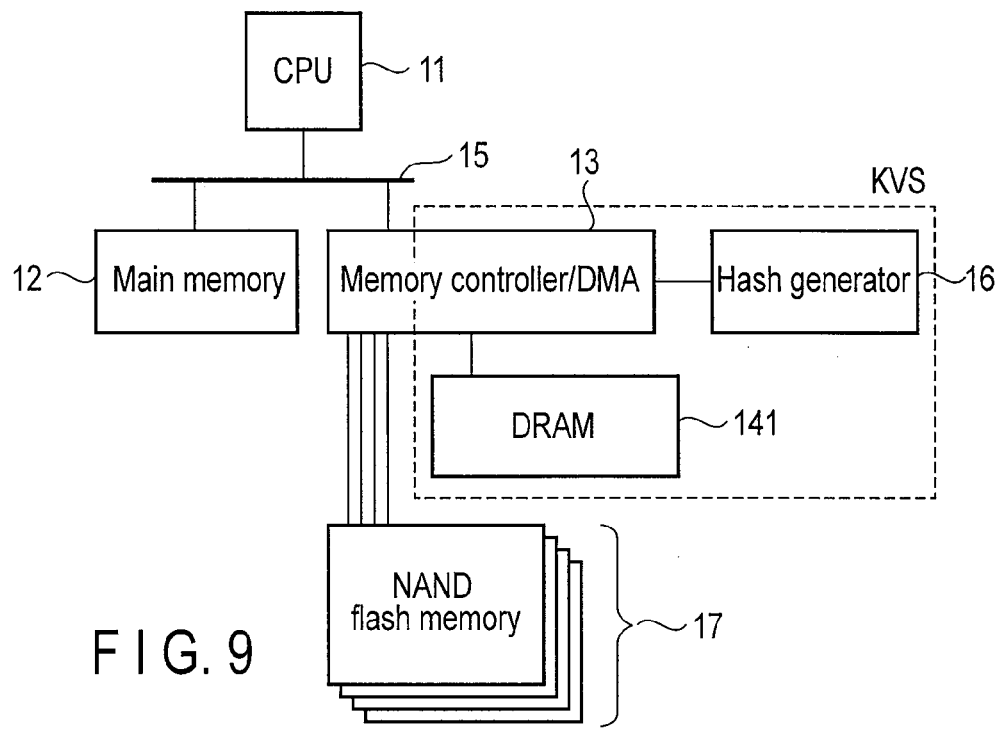
FIG. 9 is a block diagram showing a hardware arrangement of a memory system of a second modification of the first embodiment.

FIG. 9 is a block diagram showing the hardware arrangement of a memory system of the second modification according to the first embodiment.

As shown in FIG. 9, the second modification includes a hash generator 16 and a DRAM 141 as a KVS memory in the memory system of the first embodiment shown in FIG. 3. The second modification further includes a NAND flash memory 17 as a memory device connected to a memory controller 13.

The DRAM 141 shown in FIG. 9 has the same arrangement as that of the KVS memory 14 shown in FIG. 1. Also, a main memory 12 has the same arrangement as that of the main memory 12 shown in FIG. 4. In this modification, therefore, a detailed explanation of the arrangements and operations of the DRAM 141 and main memory 12 shown in FIG. 9 will be omitted.

The second modification uses the DRAM 141 as the KVS memory 14 in the first embodiment, and the processing of set operations in the second modification is the same as that in the first embodiment. In addition, the second modification includes the hash generator 16, so the load on a CPU 11 can be reduced when executing a set operation. The rest of the arrangements and effects are the same as those of the first embodiment.

[5] Third Modification

Figure 10:
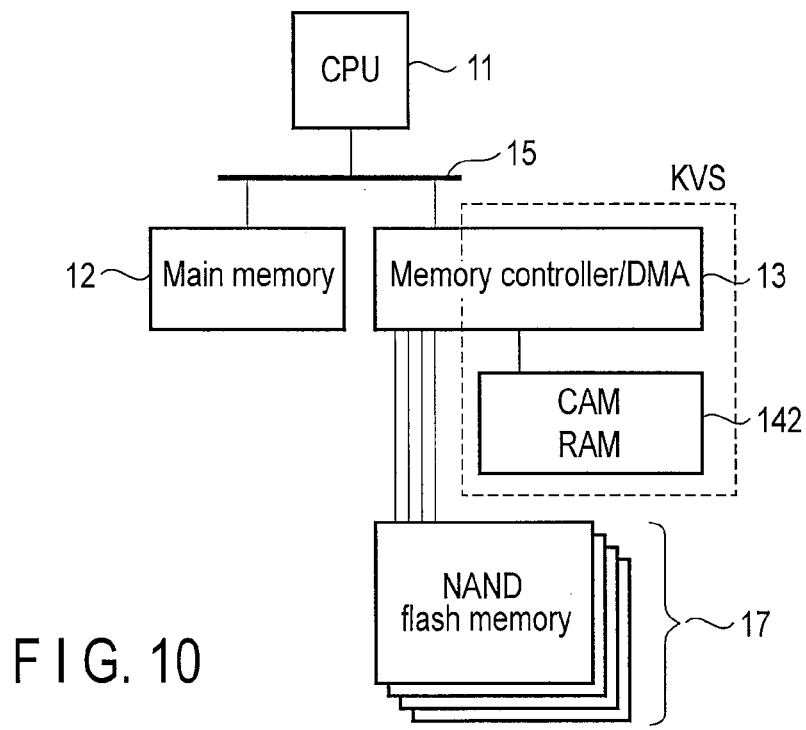
FIG. 10 is a block diagram showing a hardware arrangement of a memory system of a third modification of the first embodiment.

FIG. 10 is a block diagram showing the hardware arrangement of a memory system of the third modification according to the first embodiment.

As shown in FIG. 10, the third modification includes a CAM-RAM 142 as a KVS memory in the memory system of the first embodiment shown in FIG. 3. The third modification further includes a NAND flash memory 17 as a memory device connected to a memory controller 13.

The CAM-RAM 142 shown in FIG. 10 has the same arrangement as that of the CAM-RAM 142 shown in FIG. 2. Also, a main memory 12 has the same arrangement as that of the main memory 12 shown in FIG. 4. In this modification, therefore, a detailed explanation of the arrangements and operations of the CAM-RAM 142 and main memory 12 shown in FIG. 10 will be omitted.

The third modification uses the CAM-RAM 142 as the KVS memory 14 in the first embodiment, and the processing of set operations in the third modification is the same as that in the first embodiment. In addition, the third modification includes the CAM-RAM 142, so the load on a CPU 11 can be reduced when executing a set operation. The rest of the arrangements and effects are the same as those of the first embodiment.

Second Embodiment

[1] Hardware Arrangement

The hardware arrangement of a memory system of the second embodiment will be explained.

FIG. 11 is a block diagram showing the hardware arrangement of the memory system of the second embodiment.

As shown in FIG. 11, the memory system includes a CPU 11, main memory 12, memory controller 13, first KVS memory 24, and second KVS memory 34. The CPU 11, main memory 12, and memory controller 13 are connected by a bus 15.

The CPU 11 performs set operations (to be described later) by controlling the main memory 12, memory controller 13, and first and second KVS memories 24 and 34. The memory controller 13 controls the KVS memories 24 and 34 and other memories (not shown). The memory controller 13 includes a circuit having a direct memory access (DMA) function. When using the DMA function, data transfer between the memory controller 13 and main memory 12 can directly be controlled without the CPU 11.

The first and second KVS memories 24 and 34 each contain a data area as shown in FIG. 1 or 2. The arrangement and operation of the KVS memories 24 and 34 are the same as those explained with reference to FIG. 1 or 2, so a repetitive explanation thereof will be omitted.

[2] Set Operations

Next, the set operations in the memory system of the second embodiment will be explained.

The processing of the set operations in the second embodiment is implemented by replacing the CPU 11, KVS memory 14, and main memory 12 with the memory controller 13, first KVS memory 24, and second KVS memory 34, respectively, in the processing of the set operations in the first embodiment described previously.

Assume that two data sets "animal={dog, tuna, cat}" and "fish={porgy, tuna, salmon}" are stored in the first KVS memory 24. The processing of an AND operation, OR operation, and NOT operation will be described below with reference to FIGS. 5, 6, and 7.

(1) AND Operation

As a practical example, the processing of an operation "animal AND fish" will be explained. First, the memory controller 13 issues an instruction "GET(animal, NULL)" to the first KVS memory 24 (step S1). Subsequently, the memory controller 13 causes the second KVS memory 34 to store, as a set "answer", a data set output from the first KVS memory 24 in response to the instruction "GET(animal, NULL)". That is, the second KVS memory 34 stores a set "answer={dog, tuna, cat}" (step S2).

Then, the memory controller 13 checks whether each element in the set "answer" in the second KVS memory 34 exists in a set "fish" in the first KVS memory 24. First, the memory controller 13 issues an instruction "GET(fish, dog)" to the first KVS memory 24 (step S3). Since the return value is FALSE, the memory controller 13 deletes an element "dog" in the set "answer" in the second KVS memory 34 (step S4).

Subsequently, the memory controller 13 determines whether the processing of all elements in the set "answer" in the second KVS memory 34 is complete (step S5). Since not all the elements in the set "answer" are completely processed, the memory controller 13 returns to step S3, and repeats the processing from step S3.

The memory controller 13 searches the set "fish" in the first KVS memory 24 for "tuna". That is, the memory controller 13 issues an instruction "GET(fish, tuna)" to the first KVS memory 24 (step S3). Since the return value is TRUE, the memory controller 13 advances to the next step.

The memory controller 13 performs the same processing for "cat", i.e., searches the set "fish" in the first KVS memory 24 for "cat". That is, the memory controller 13 issues an instruction "GET(fish, cat)" to the first KVS memory 24 (step S3). Since the return value is FALSE, the memory controller 13 deletes the element "cat" in the set "answer" in the second KVS memory 34 (step S4).

When the processing of all the elements in the set "answer" is complete in step S5, the set "answer" in the second KVS memory 34 becomes "answer={tuna}", and this is the solution for the AND operation (step S6).

(2) OR Operation

As a practical example, the processing of an operation "animal OR fish" will be explained. First, the memory controller 13 issues an instruction "GET(animal, NULL)" to the first KVS memory 24 (step S11). Subsequently, the memory controller 13 causes the second KVS memory 34 to store, as a set "answer", a data set output from the first KVS memory 24 in response to the instruction "GET(animal, NULL)". That is, the second KVS memory 34 stores a set "answer={dog, tuna, cat}" (step S12).

Then, the memory controller 13 checks whether each element in a set "fish" in the first KVS memory 24 exists in the set "answer" in the second KVS memory 34. First, the memory controller 13 issues an instruction "GET(answer, porgy)" to the second KVS memory 34 (step S13). Since the return value is FALSE, the memory controller 13 puts "porgy" in the set "answer" in the second KVS memory 34 (step S14).

Subsequently, the memory controller 13 determines whether the processing of all elements in the set "fish" in the first KVS memory 24 is complete (step S15). Since not all the elements in the set "fish" are completely processed, the memory controller 13 returns to step S13, and repeats the processing from step S13.

The memory controller 13 checks whether "tuna" in the set "fish" in the first KVS memory 24 exists in the set "answer" in the second KVS memory 34. That is, the memory controller 13 issues an instruction "GET(answer, tuna)" to the second KVS memory 34 (step S13). Since the return value is TRUE, the memory controller 13 advances to the next step.

The memory controller 13 performs the same processing for "salmon", i.e., checks whether "salmon" in the set "fish" exists in the set "answer" in the second KVS memory 34. That is, the memory controller 13 issues an instruction "GET(answer, salmon)" to the second KVS memory 34 (step S13). Since the return value is FALSE, the memory controller 13 puts "salmon" in the set "answer" in the second KVS memory 34 (step S14).

When the processing of all the elements in the set "fish" is complete in step S15, the set "answer" in the second KVS memory 34 becomes "answer={dog, tuna, cat, porgy, salmon}", and this is the solution for the OR operation (step S16).

(3) NOT Operation

As a practical example, the processing of an operation "animal NOT fish" will be explained. First, the memory controller 13 issues an instruction "GET(animal, NULL)" to the first KVS memory 24 via the main controller 13 (step S21). Subsequently, the memory controller 13 causes the second KVS memory 34 to store, as a set "answer", a data set output from the first KVS memory 24 in response to the instruction "GET(animal, NULL)". That is, the second KVS memory 34 stores a set "answer={dog, tuna, cat}" (step S22).

Then, the memory controller 13 deletes each element in a set "fish" in the first KVS memory 24, from the set "answer" in the second KVS memory 34. First, the memory controller 13 issues an instruction "DELETE(answer, porgy)" to the second KVS memory 34 (step S23).

Subsequently, the memory controller 13 determines whether the processing of all elements in the set "fish" in the first KVS memory 24 is complete (step S24). Since not all the elements in the set "fish" are completely processed, the memory controller 13 returns to step S23, and repeats the processing from step S23.

Similarly, the memory controller 13 deletes "tuna" and "salmon" in the set "fish" in the first KVS memory 24, from the set "answer" in the second KVS memory 34 (step S23).

When the processing of all the elements in the set "fish" is complete in step S24, the set "answer" in the second KVS memory 34 becomes "answer={dog, cat}", and this is the solution for the NOT operation (step S25).

Note that all the works performed by the memory controller 13 described above can be executed by the direct memory access (DMA) function of the memory controller 13. When the DMA function of the memory controller 13 performs all the works performed by the memory controller 13, the above-described set operations can be performed without applying any load on the memory controller 13.

[3] First Modification

FIG. 12 is a block diagram showing the hardware arrangement of a memory system of the first modification according to the second embodiment.

As shown in FIG. 12, the first modification includes a hash generator 16, and a DRAM 241 and CAM-RAM NAND flash memory 341 as KVS memories, in the memory system of the second embodiment shown in FIG. 11.

The DRAM 241 shown in FIG. 12 has the same arrangement as that of the KVS memory 14 shown in FIG. 1. Also, the CAM-RAM NAND flash memory 341 has the same arrangement as that of the CAM-RAM 142 shown in FIG. 2. In this modification, therefore, a detailed explanation of the arrangements and operations of the DRAM 241 and CAM-RAM NAND flash memory 341 shown in FIG. 12 will be omitted.

The processing of set operations in the first modification is the same as that in the second embodiment. In addition, the first modification includes the hash generator 16 and CAM-RAM NAND flash memory 341, so the load on a CPU 11 can be reduced when executing a set operation. The rest of the arrangements and effects are the same as those of the second embodiment.

[4] Second Modification

FIG. 13 is a block diagram showing the hardware arrangement of a memory system of the second modification according to the second embodiment.

As shown in FIG. 13, the second modification includes a CAM-RAM 242 and CAM-RAM NAND flash memory 341 as KVS memories, in the memory system of the second embodiment shown in FIG. 11.

The CAM-RAM 242 and CAM-RAM NAND flash memory 341 shown in FIG. 13 each have the same arrangement as that of the CAM-RAM 142 shown in FIG. 2. In this modification, therefore, a detailed explanation of the arrangements and operations of the CAM-RAM 242 and CAM-RAM NAND flash memory 341 shown in FIG. 13 will be omitted.

The processing of set operations in the second modification is the same as that in the second embodiment. In addition, the second modification includes the CAM-RAM 242 and CAM-RAM NAND flash memory 341, so the load on a CPU 11 can be reduced when executing a set operation. The rest of the arrangements and effects are the same as those of the second embodiment.

The embodiments can provide a memory system capable of significantly reducing the system load of set operations that frequently occur in a full text search system or the like, and performing set operations at a higher speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
a first memory device storing data and key-value data including at least one pair of a key and a value corresponding to the key;
a second memory device; and
a control circuit, communicating with the first memory device and the second memory device, and performing a set operation using the key-value data stored in the first memory device and using the second memory device, the set operation including a first instruction and a second instruction,
wherein,
the control circuit performs the set operation using the key and the value corresponding to the key,
the control circuit issues the first instruction to the first memory device and issues the second instruction to the second memory device,
the second memory device stores the key-value data in response to the second instruction from the control circuit, and
the set operation produces an answer comprising at least the value.

2. The system according to claim 1, wherein
the key-value data includes a first address, a first key and a first value corresponding to the first key, the first key and the first value being stored at the first address, a second address being stored in the first value, and
a second value is obtained by referring to a storage location in the first memory device, which is designated by the second address.

3. The system according to claim 2, further comprising a hash generator converting the first key into the first address by using a hash function.

4. The system according to claim 1, wherein the first memory device comprises a DRAM.

5. The system according to claim 2, wherein the first memory device comprises:
- a content addressable memory (CAM) comparing the first key with data stored in the first memory device in response to input of the first key, and output a third address at which data matching the first key is stored; and
- a RAM undergoing a write and read by designating the third address.

6. The system according to claim 1, wherein the second memory device comprises a main memory controlled by the control circuit.

7. The system according to claim 6, wherein the main memory comprises a DRAM.

8. The system according to claim 2, wherein the second memory device comprises:
- a content addressable memory (CAM) comparing the first key with data stored in the second memory device in response to input of the first key, and output a third address at which data matching the first key is stored; and
- a RAM undergoing a write and read by designating the third address.

9. The system according to claim 8, wherein the second memory device comprises a NAND flash memory.

10. The system according to claim 1, further comprising a memory controller connected between the control circuit and the first memory device,
wherein the memory controller comprises a direct memory access (DMA) circuit, and the direct memory access (DMA) circuit controls the second memory device without the control circuit.

11. The system according to claim 1, wherein the control circuit varies a memory capacity of the key-value data formed in the first memory device, in accordance with a request based on the key-value data.

12. The system according to claim 1, wherein the control circuit comprises a CPU connected to the first memory device and the second memory device via a bus.

13. The system according to claim 1, wherein the set operation performed by the control circuit includes at least one of AND, OR, and NOT.

* * * * *